United States Patent

Okamoto

(10) Patent No.: US 9,848,095 B2
(45) Date of Patent: Dec. 19, 2017

(54) IMAGE FORMING APPARATUS AND NON-TRANSITORY COMPUTER READABLE RECORDING MEDIUM

(71) Applicant: KYOCERA DOCUMENT SOLUTIONS INC., Osaka (JP)

(72) Inventor: Kentaro Okamoto, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/446,064

(22) Filed: Mar. 1, 2017

(65) Prior Publication Data

US 2017/0257499 A1  Sep. 7, 2017

(30) Foreign Application Priority Data

Mar. 3, 2016 (JP) ................. 2016-040665

(51) Int. Cl.
| | | |
|---|---|---|
| G06K 15/00 | (2006.01) | |
| H04N 1/00 | (2006.01) | |
| H04B 5/00 | (2006.01) | |
| H04N 1/23 | (2006.01) | |
| H04N 1/32 | (2006.01) | |
| G06K 15/10 | (2006.01) | |
| G06K 7/10 | (2006.01) | |

(52) U.S. Cl.
CPC ..... *H04N 1/00342* (2013.01); *G06K 7/10336* (2013.01); *G06K 15/102* (2013.01); *G06K 15/4025* (2013.01); *H04B 5/0031* (2013.01); *H04N 1/2323* (2013.01); *H04N 1/32122* (2013.01)

(58) Field of Classification Search
CPC ............ G06K 7/10336; G06K 15/102; H04B 5/0062; H04B 5/0031; H04N 1/00342; H04N 1/00376; H04N 1/32122
See application file for complete search history.

(56) References Cited

U.S. PATENT DOCUMENTS

| | | | | |
|---|---|---|---|---|
| 2005/0270154 A1* | 12/2005 | Nelson | .................... | F41H 11/12 340/551 |
| 2007/0058994 A1* | 3/2007 | Yaguchi | ............... | G03G 15/607 399/17 |
| 2009/0207002 A1* | 8/2009 | Maruo | .................... | G06K 1/20 340/10.51 |

(Continued)

FOREIGN PATENT DOCUMENTS

JP  2008-165827 A  7/2008

*Primary Examiner* — Moustapha Diaby
(74) *Attorney, Agent, or Firm* — Li & Cai Intellectual Property (USA) Office

(57) ABSTRACT

There is provided an image forming apparatus, including: a feeder mechanism that feeds a sheet in a sheet-feeding direction; a metal-detector antenna capable of detecting an NFC (Near Field Communication) tag on the sheet entirely in the carriage-moving direction over the sheet; a carriage that moves back and forth in the carriage-moving direction and includes a print head, the print head forming an image on an area of the sheet, the area having passed the metal-detector antenna; an NFC antenna on the carriage, the NFC antenna being capable of communicating with the NFC tag via near field communication; and an NFC writer that writes NFC data in the NFC tag via the NFC antenna.

9 Claims, 3 Drawing Sheets

(56) References Cited

U.S. PATENT DOCUMENTS

| | | | |
|---|---|---|---|
| 2010/0214592 A1* | 8/2010 | Muroi | B41J 3/50 358/1.14 |
| 2012/0224223 A1* | 9/2012 | Yamamoto | G06K 17/0025 358/1.15 |
| 2015/0002865 A1* | 1/2015 | Fujinaga | G06K 15/021 358/1.5 |

* cited by examiner

IMAGE FORMING APPARATUS AND NON-TRANSITORY COMPUTER READABLE RECORDING MEDIUM

CROSS REFERENCE TO RELATED APPLICATION

This application claims the benefit of Japanese Priority Patent Application JP2016-040665 filed Mar. 3, 2016, the entire contents of which are incorporated herein by reference.

BACKGROUND OF THE INVENTION

1. Field of the Invention

The present disclosure relates to an image forming apparatus including a print head, which moves back and forth in the carriage-moving direction to form an image on a sheet, the image forming apparatus being capable of electrically writing information in a recording medium on the sheet. The present disclosure further relates to a non-transitory computer readable recording medium that records a program.

2. Description of Related Art

There is known an image forming apparatus including a print head, which moves back and forth in the carriage-moving direction to form an image on a sheet (for example, ink jet printer), the image forming apparatus being capable of electrically writing information in a recording medium on the sheet, on which an image is formed.

SUMMARY OF THE INVENTION

According to an embodiment of the present disclosure, there is provided an image forming apparatus, including: a feeder mechanism that feeds a sheet in a sheet-feeding direction; a metal-detector antenna capable of detecting an NFC tag on the sheet entirely in the carriage-moving direction over the sheet; a carriage that moves back and forth in the carriage-moving direction and includes a print head, the print head forming an image on an area of the sheet, the area having passed the metal-detector antenna; an NFC antenna on the carriage, the NFC antenna being capable of communicating with the NFC tag via near field communication; and an NFC writer that writes NFC data in the NFC tag via the NFC antenna.

According to an embodiment of the present disclosure, there is provided a non-transitory computer readable recording medium that records a program executable by a computer of an image forming apparatus, the image forming apparatus including a feeder mechanism that feeds a sheet in a sheet-feeding direction, a metal-detector antenna capable of detecting an NFC tag on the sheet entirely in the carriage-moving direction over the sheet, a carriage that moves back and forth in the carriage-moving direction and includes a print head, the print head forming an image on an area of the sheet, the area having passed the metal-detector antenna, an NFC antenna on the carriage, the NFC antenna being capable of communicating with the NFC tag via near field communication, and an NFC writer that writes NFC data in the NFC tag via the NFC antenna, the program causing the computer to operate as a controller circuit that: detects a position of an NFC tag in the sheet-feeding direction via the metal-detector antenna, the NFC tag being on the sheet being fed; stops feeding the sheet at a position, at which the NFC antenna being capable of communicating with the NFC tag at the detected position in the sheet-feeding direction; detects a position of the NFC tag in the carriage-moving direction via the NFC antenna while controlling the carriage to move in the carriage-moving direction; and controls the NFC writer to write NFC data in the detected NFC tag via the NFC antenna.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Hardware Configuration of Image Forming Apparatus

Figure 1:
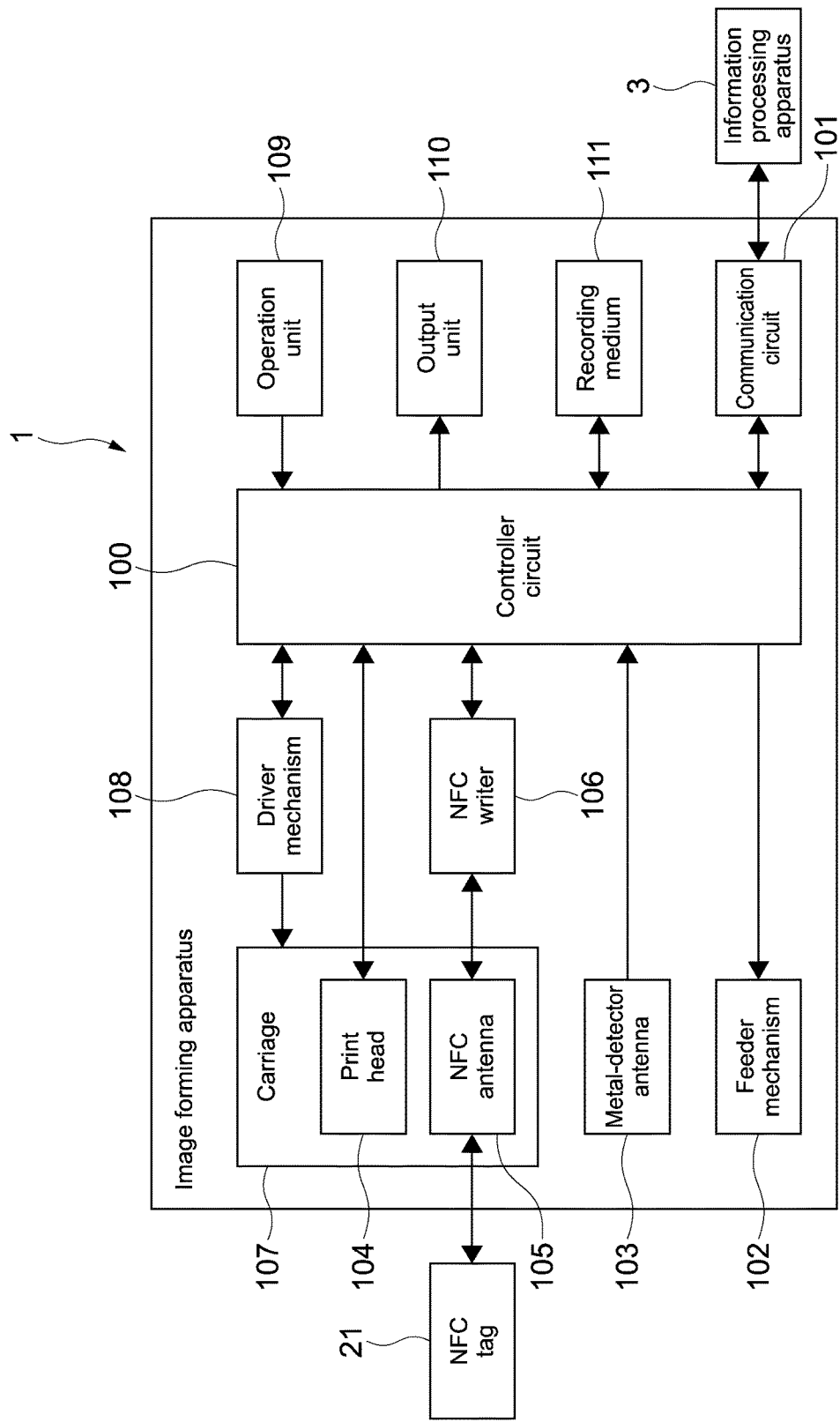
FIG. 1 shows a hardware configuration of an image forming apparatus of an embodiment of the present disclosure.

FIG. 1 shows a hardware configuration of an image forming apparatus of an embodiment of the present disclosure.

The image forming apparatus 1 includes a print head, which moves back and forth in the carriage-moving direction and forms an image on a sheet. Typically, the image forming apparatus 1 is an ink-jet printer.

The image forming apparatus 1 at least includes the controller circuit 100, the communication circuit 101, the feeder mechanism 102, the metal-detector antenna 103, the print head 104, the NFC (Near Field communication) antenna 105, the NFC writer 106, the driver mechanism 108, the operation unit 109, the output unit 110, and the recording medium 111.

The controller circuit 100 includes a CPU, a RAM, a ROM, dedicated hardware circuits, and the like, and controls the overall operations of the image forming apparatus 1. The controller circuit 100 is connected to those units, controls operations of those units, and sends/receives signals and/or data to/from those units. The controller circuit 100 records, in the RAM of the controller circuit 100, the position of the NFC tag 21 and an error occurred when writing in the NFC tag 21.

The communication circuit 101 is capable of communicating with the external information processing apparatus 3 (personal computer, etc.), and receives printable data from the information processing apparatus 3.

The feeder mechanism 102 includes motors and other components and feeds the sheet 2, on which an image is to be formed, in the sheet-feeding direction.

The metal-detector antenna 103 is located in the feeding path for the sheet 2. The metal-detector antenna 103 is capable of detecting a metal as a result of electromagnetic induction entirely in the carriage-moving direction (i.e., in the range between one end and the other end of the sheet 2 in the carriage-moving direction) over the sheet 2 fed by the feeder mechanism 102. Typically, the metal-detector antenna 103 includes one antenna (coil) and is located entirely in the carriage-moving direction over a sheet, where the image forming apparatus 1 is capable of feeding the sheet having such a size.

The print head 104 is located at the downstream of the metal-detector antenna 103 in the feeding direction (direction of arrow A of FIG. 2) for the sheet 2. The print head 104 moves back and forth in the carriage-moving direction, and forms an image on the area of the sheet 2, this area having passed the metal-detector antenna 103. Typically, the print head 104 is an ink jet head.

The NFC antenna 105 is an antenna for near field communication. The NFC antenna 105 sends/receives electric waves generated in the near field communication to/from the NFC tag 21 to thereby communicate with the NFC tag 21.

The NFC writer 106 writes NFC data in the NFC tag 21 via the NFC antenna 105.

At least the print head 104 and the NFC antenna 105 are mounted on the carriage 107.

The driver mechanism 108 includes motors and other components, and moves the carriage 107.

The operation unit 109 accepts instructions from a user for various operations and processes that the image forming apparatus 1 is capable of executing.

The output unit 110 outputs texts and the like on a display, and outputs sounds to a speaker.

The recording medium 111 is a nonvolatile memory such as a hard disk drive, and records printable data received via the communication circuit 101.

2. Outline of Operations of Image Forming Apparatus

Figure 2:
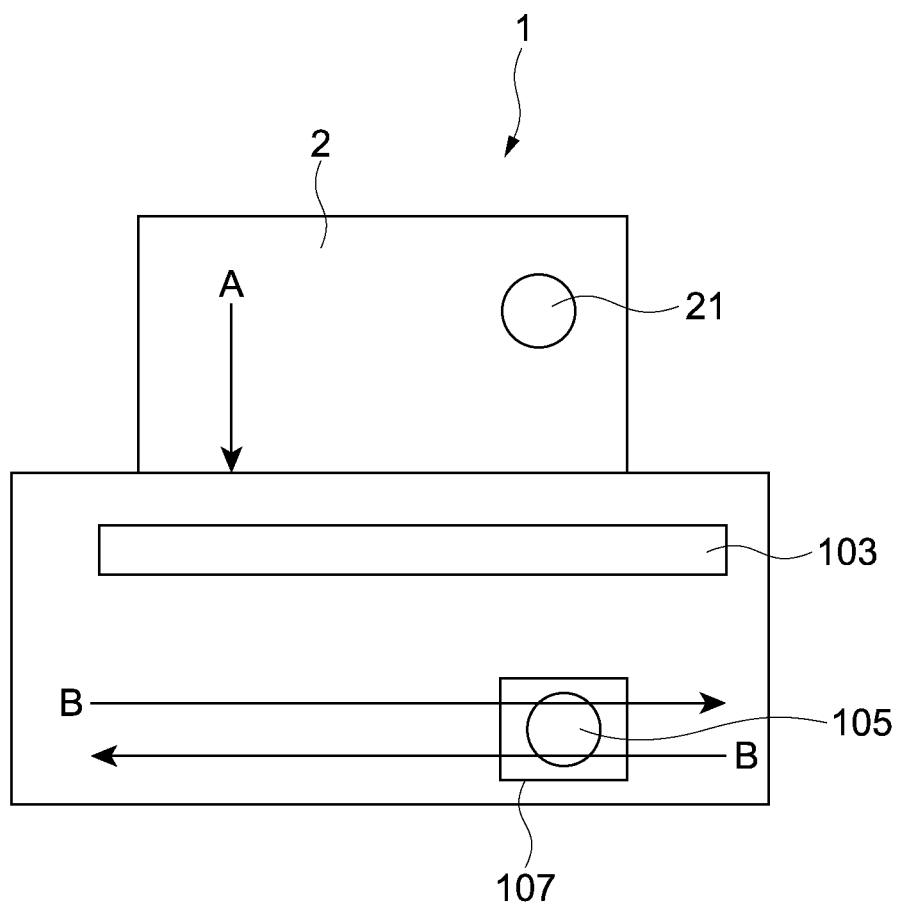
FIG. 2 shows an outline of operations of the image forming apparatus.

FIG. 2 shows an outline of operations of the image forming apparatus.

The feeder mechanism 102 feeds the sheet 2 in the sheet-feeding direction (direction of arrow A of FIG. 2). The sheet 2 has the NFC tag 21 attached. For example, the sticker-type NFC tag 21 is attached on the sheet 2. No NFC data is written in the NFC tag 21 yet.

The sheet 2 is fed in the sheet-feeding direction and thus passes the metal-detector antenna 103 located in the feeding path for the sheet 2. The metal-detector antenna 103 is capable of detecting a metal as a result of electromagnetic induction entirely in the carriage-moving direction over the sheet 2 fed by the feeder mechanism 102. The metal-detector antenna 103 detects the position of the NFC tag 21 on the sheet 2 in the sheet-feeding direction.

Meanwhile, the carriage 107 moves back and forth in the carriage-moving direction (direction of arrow B of FIG. 2) to form an image on the sheet 2 with the print head 104.

The NFC antenna 105 is on the carriage 107, which moves back and forth in the carriage-moving direction. The NFC antenna 105 detects the position of the NFC tag 21 in the carriage-moving direction, and communicates with the detected NFC tag 21 via the near field communication. The NFC writer 106 writes NFC data in the NFC tag 21 via the NFC antenna 105.

3. Details of Operations of Image Forming Apparatus

Figure 3:
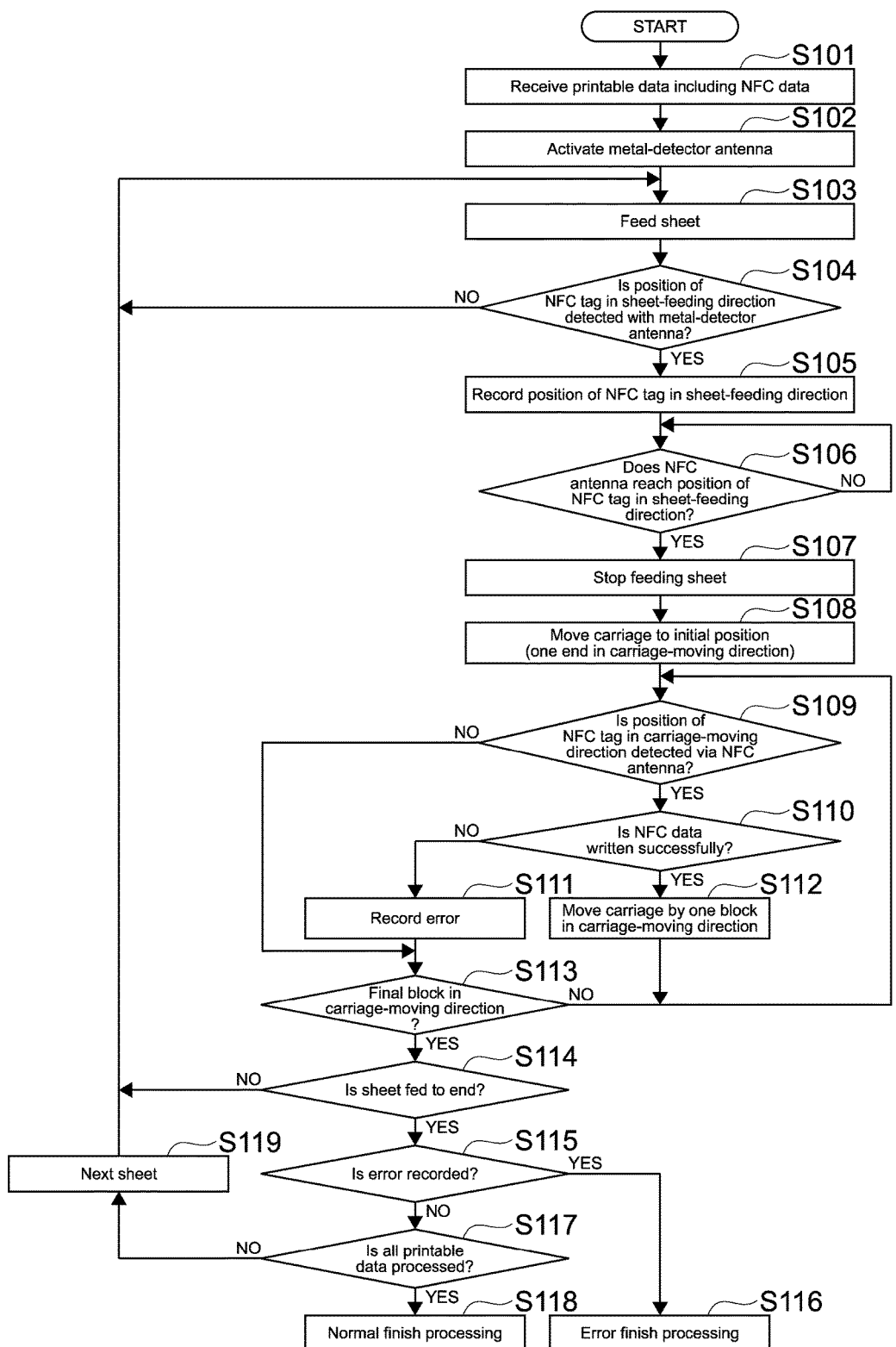
FIG. 3 shows details of operations of the image forming apparatus.

FIG. 3 shows details of operations of the image forming apparatus (operations to write information in NFC tag).

The controller circuit 11 loads an information processing program recorded in a ROM, which is an example of a non-transitory computer readable recording medium, in a RAM to thereby control the image forming apparatus 1 as follows.

The controller circuit 11 receives printable data from the information processing apparatus 3 via the communication circuit 101, and records the printable data in the recording medium 111. The printable data includes image data of an image to be formed on the sheet 2, and NFC data to be written in the NFC tag 21 on the sheet 2 (Step S101). The image data is image data of an image to be formed on at least one page. The NFC data includes a page number.

When the controller circuit 11 receives the printable data including NFC data, the controller circuit 11 activates the metal-detector antenna 103 (Step S102). The controller circuit 11 controls the feeder mechanism 102 to start feeding the sheet 2 in the sheet-feeding direction (Step S103). The controller circuit 11 controls the driver mechanism 108 to move the carriage 107 back and forth in the carriage-moving direction, and starts forming an image on the sheet 2 by using the print head 104.

The sheet 2 fed in the sheet-feeding direction passes the metal-detector antenna 103. The metal-detector antenna 103 detects the position of the NFC tag 21 on the sheet 2 in the sheet-feeding direction as a result of electromagnetic induction (Step S104, YES). The controller circuit 100 records the detected position of the NFC tag 21 in the sheet-feeding direction (Step S105). Note that a sheet may have a plurality of NFC tags attached. Where a sheet has a plurality of NFC tags attached in the sheet-feeding direction, the controller circuit 100 detects and records a plurality of positions. Meanwhile, where a sheet has a plurality of NFC tags attached in the carriage-moving direction, the controller circuit 100 detects and records one position, collectively, instead of a plurality of positions of a plurality of NFC tags (i.e., without distinguishing between a plurality of NFC tags). The controller circuit 100 may record a position of the sheet 2 in the sheet-feeding direction for a position of the NFC tag 21 in the sheet-feeding direction, which is detected in Step S104. Because the feeding speed of the sheet 2 fed by the feeder mechanism 102 is predetermined, the position of the sheet 2 in the sheet-feeding direction is obtained based on the time at which the feeder mechanism 102 started feeding the sheet 2.

Controlled by the controller circuit 100, the carriage 107 (strictly speaking, the NFC antenna 105) reaches the recorded (Step S105) position of the NFC tag 21 in the sheet-feeding direction (Step S106). When the NFC antenna 105 reaches the position of the NFC tag 21 in the sheet-feeding direction (Step S106, YES), the controller circuit 100 controls the feeder mechanism 102 to stop feeding the sheet 2 (Step S107). In Step S106, the controller circuit 100 may determine the position of the NFC tag 21 in the sheet-feeding direction based on the time at which the feeder mechanism 102 started feeding the sheet 2. Specifically, the controller circuit 100 may determine the position of the NFC tag 21 in the sheet-feeding direction based on a value obtained by adding the time, during which the sheet 2 moves from the metal-detector antenna 103 to the carriage 107 (strictly speaking, the NFC antenna 105), to the time from the start of feeding the sheet 2 to detection in Step S104 (which is a specific time because the feeding speed for the sheet 2 is predetermine and because the position relation of the metal-detector antenna 103 and the carriage 107 in the sheet-feeding direction is fixed.).

The controller circuit 100 controls the driver mechanism 108 to move the carriage 107 to the initial position (one end of the sheet in the carriage-moving direction) (Step S108).

The controller circuit 100 activates the NFC writer 106. The controller circuit 100 searches for the NFC tag 21 via the NFC antenna 105 (Step S109). The following is a specific example of a method of detecting the NFC tag 21. The controller circuit 100 determines that the NFC tag 21 is detected when the NFC writer 106 starts communicating with the NFC tag 21 via the NFC antenna 105 via the near field communication.

When the controller circuit 100 detects the NFC tag 21 (Step S109, YES), then the controller circuit 100 controls the NFC writer 106 to write the NFC data included in the printable data in the NFC tag 21 via the NFC antenna 105 (Step S110).

When the controller circuit 100 determines that the controller circuit 100 fails to write the NFC data (Step S110, NO), then the controller circuit 100 records occurrence of an error (Step S111). Note that the controller circuit 100 "fails to write NFC data" even if printable data includes NFC data (Step S101) and the NFC tag 21 is detected (Step S109) in the following circumstances. For an example, the controller circuit 100 fails to write NFC data because the NFC tag 21 is broken or has another trouble. For another example, the controller circuit 100 fails to write NFC data pieces in NFC tags one-to-one because the number of the NFC data pieces is different from the number of the NFC tags.

Meanwhile, when the controller circuit 100 determines that NFC data is written successfully (Step S110, YES), then the controller circuit 100 controls the driver mechanism 108 to move the carriage 107 by one block in the carriage-moving direction (Step S112). The controller circuit 100 searches for the NFC tag 21 (Step S109) and writes NFC data (Step S110) if the NFC tag 21 is detected until the carriage 107 finally reaches the final block (the other end of the sheet in the carriage-moving direction) (Step S113, YES). As a result, the controller circuit 100 moves the carriage 107 at least entirely in the carriage-moving direction over the sheet 2. The controller circuit 100 searches for the NFC tag 21 from one end to the other end of the sheet 2 in the carriage-moving direction and writes NFC data if the NFC tag 21 is detected. Note that, where a sheet has a plurality of NFC tags attached in the carriage-moving direction, the controller circuit 100 is capable of detecting all the NFC tags and writing NFC data in all the NFC tags detected.

When the controller circuit 100 finishes searching for the NFC tag 21 (Step S109) and writing NFC data (Step S110) entirely in the carriage-moving direction over the sheet (Step S113, YES), then the controller circuit 100 controls the feeder mechanism 102 to feed the sheet 2 in the sheet-feeding direction once again (Step S114, NO and Step S103). The controller circuit 100 controls the feeder mechanism 102 to feed the sheet 2 to the end and eject the sheet 2 (Step S114, YES). Then the controller circuit 100 determines if an error is recorded (Step S111) or not (Step S115).

If the controller circuit 100 determines that an error is recorded (Step S115, YES), the controller circuit 100 outputs (for example, displays) the error to the output unit 110 (Step S116). Meanwhile, when the controller circuit 100 determines that no error is recorded (Step S115, NO), the controller circuit 100 determines if all the image data in the received (Step S101) printable data is formed or not, and if all the NFC data is written or not (Step S117).

After the controller circuit 100 determines that all the image data is formed and all the NFC data is written (Step S117, YES), the controller circuit 100 finishes the series of processing normally (Step S118). Meanwhile, if the controller circuit 100 determines that unprocessed image data and NFC data remain (Step S117, NO), the controller circuit 100 controls the feeder mechanism 102 to feed (Step S113) the next (2nd page, etc.) sheet (Step S119).

4. Conclusion

According to this embodiment, only when the metal-detector antenna 103 detects the position of the NFC tag 21 on the sheet 2 in the sheet-feeding direction (Step S104, YES), the controller circuit 100 stops feeding the sheet 2 (Step S107), detects the position of the NFC tag 21 in the carriage-moving direction (Step S109, YES), and writes NFC data (Step S110).

As described above, firstly, it is only necessary to simply (i.e., roughly) detect the position of the NFC tag 21 in the sheet-feeding direction by using the metal-detector antenna 103 as a result of electromagnetic induction (which is much like analog). Therefore it is not necessary to slow down the sheet feeding speed, which is the same as the sheet feeding speed for the normal image forming. Only when the NFC antenna 105 reaches the detected position of the NFC tag 21 in the sheet-feeding direction, the controller circuit 100 stops feeding the sheet 2 and writes NFC data. As described above, only when the NFC antenna 105 reaches the position in sheet-feeding direction, in which it is obvious that the NFC tag 21 exists, the controller circuit 100 stops feeding the sheet 2 and communicates with the NFC tag 21 via the near field communication. Therefore it is possible to minimize the time during which feeding of the sheet is stopped in order to detect the position of the NFC tag 21 in the carriage-moving direction and write NFC data. Therefore it is possible to minimize the time necessary to form an image and write NFC data.

Further, after detecting the position of the NFC tag 21 in the sheet-feeding direction as a result of electromagnetic induction, the position of an NFC tag is detected at the position in the sheet-feeding direction entirely in the carriage-moving direction. Therefore it is possible to detect the position of the NFC tag without fail. Therefore NFC data in printable data only has to include a page number as position information, and does not have to include the position of an NFC tag on a sheet. Therefore printable data including NFC data is simple. In addition, the controller circuit will not fail to write NFC data as a result of difference between the position of an NFC tag on a sheet that NFC data indicates and the actual position of an NFC tag on a sheet.

According to a typical technique, an ink-jet printer includes, immediately in front of a head unit, a communication circuit that sends information to a tag. According to this technique, an image is printed on a sheet, and, at the same time, a communication circuit communicates with a tag attached on a sheet to send information to the tag. According to this technique, the communication circuit is located at an arbitrary position within a range in which the communication circuit is capable of communicating with a tag attached on a sheet. In other words, the position of the tag attached on the sheet depends on the position of the communication circuit. According to this technique, it would appear that a strip-like tag, which has a length almost the same as or slightly smaller than the length of the sheet, is attached on the entire width of the sheet in the width direction in order to cope with a problem that the position of the tag depends on the position of the communication circuit. However, as a result, the tag has to be large (strip-like tag having a length almost the same as the length of the sheet).

To the contrary, according to this embodiment, the controller circuit 100 searches for the NFC tag 21 (Step S109)

and writes NFC data (Step S110) if the NFC tag 21 is detected at the position in sheet-feeding direction, in which it is obvious that the NFC tag 21 exists, entirely in the carriage-moving direction (Step S113, YES). Therefore it is possible to detect all the NFC tags and write NFC data irrespective of the positions, number, shapes, sizes, and the like of the NFC tags.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
   a feeder mechanism that feeds a sheet in a sheet-feeding direction;
   a metal-detector antenna capable of detecting an NFC tag on the sheet entirely in a carriage-moving direction over the fed sheet, the metal-detector antenna being located entirely in the carriage-moving direction over a sheet having a size, the feeder mechanism being capable of feeding the sheet having the size, the carriage-moving direction being perpendicular to the sheet-feeding direction;
   a carriage that moves back and forth in the carriage-moving direction and includes a print head, the print head forming an image on an area of the sheet, the area having passed the metal-detector antenna, the carriage being located at downstream of the metal-detector antenna in the sheet-feeding direction;
   an NFC antenna on the carriage, the NFC antenna being capable of communicating with the NFC tag detected by the metal-detector antenna via near field communication; and
   an NFC writer that writes NFC data in the NFC tag via the NFC antenna.

2. The image forming apparatus according to claim 1, further comprising:
   a controller circuit that
      detects a position of an NFC tag in the sheet-feeding direction via the metal-detector antenna, the NFC tag being on the sheet being fed,
      stops feeding the sheet at a position, at which the NFC antenna being capable of communicating with the NFC tag at the detected position in the sheet-feeding direction,
      detects a position of the NFC tag in the carriage-moving direction via the NFC antenna while controlling the carriage to move in the carriage-moving direction, and
      controls the NFC writer to write NFC data in the detected NFC tag via the NFC antenna.

3. The image forming apparatus according to claim 2, wherein
   the NFC tag includes at least one NFC tag, and
   the controller circuit detects a position/positions of the at least one NFC tag in the carriage-moving direction via the NFC antenna while moving the carriage entirely in the carriage-moving direction over the sheet.

4. The image forming apparatus according to claim 2, wherein
   the controller circuit detects, as the position of the NFC tag in the sheet-feeding direction, a position of the sheet, at which the metal-detector antenna detects a metal as a result of electromagnetic induction.

5. The image forming apparatus according to claim 2, further comprising:
   a communication circuit capable of communicating with an information processing apparatus, wherein
   the controller circuit receives printable data from the information processing apparatus via the communication circuit, and
   the printable data includes image data of an image to be formed on the sheet, and NFC data to be written in the NFC tag.

6. The image forming apparatus according to claim 5, wherein
   the image data is image data of an image to be formed on at least one page, and
   the NFC data includes a page number.

7. The image forming apparatus according to claim 5, wherein
   the controller circuit outputs an error if number of the NFC data pieces of the printable data is different from number of the detected NFC tags.

8. The image forming apparatus according to claim 2, wherein
   the controller circuit outputs an error if the controller circuit fails to write the NFC data in the detected NFC tag.

9. A non-transitory computer readable recording medium that records a program executable by a computer of an image forming apparatus,
   the image forming apparatus including
      a feeder mechanism that feeds a sheet in a sheet-feeding direction,
      a metal-detector antenna capable of detecting an NFC tag on the sheet entirely in a carriage-moving direction over the fed sheet, the metal-detector antenna being located entirely in a carriage-moving direction over a sheet having a size, the feeder mechanism being capable of feeding the sheet having the size, the carriage-moving direction being perpendicular to the sheet-feeding direction,
      a carriage that moves back and forth in the carriage-moving direction and includes a print head, the print head forming an image on an area of the sheet, the area having passed the metal-detector antenna, the carriage being located at downstream of the metal-detector antenna in the sheet-feeding direction,
      an NFC antenna on the carriage, the NFC antenna being capable of communicating with the NFC tag detected by the metal-detector antenna via near field communication, and
      an NFC writer that writes NFC data in the NFC tag via the NFC antenna, the program causing the computer to operate as a controller circuit that:
   detects a position of an NFC tag in the sheet-feeding direction via the metal-detector antenna, the NFC tag being on the sheet being fed;
   stops feeding the sheet at a position, at which the NFC antenna being capable of communicating with the NFC tag at the detected position in the sheet-feeding direction;
   detects a position of the NFC tag in the carriage-moving direction via the NFC antenna while controlling the carriage to move in the carriage-moving direction; and
   controls the NFC writer to write NFC data in the detected NFC tag via the NFC antenna.

* * * * *